(12) United States Patent
Becker et al.

(10) Patent No.: US 11,714,829 B2
(45) Date of Patent: Aug. 1, 2023

(54) PARALLEL CALCULATION OF ACCESS PLANS DELIMITATION USING TABLE PARTITIONS

(71) Applicant: SAP SE, Walldorf (DE)

(72) Inventors: Alexander Becker, Mühlhausen (DE); Sebastian Haase, Kronau (DE)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 17/121,154

(22) Filed: Dec. 14, 2020

(65) Prior Publication Data
US 2022/0188333 A1      Jun. 16, 2022

(51) Int. Cl.
| | |
|---|---|
| *G06F 16/27* | (2019.01) |
| *G06F 16/2452* | (2019.01) |
| *G06F 16/25* | (2019.01) |
| *G06F 16/22* | (2019.01) |

(52) U.S. Cl.
CPC ........ *G06F 16/278* (2019.01); *G06F 16/2282* (2019.01); *G06F 16/24524* (2019.01); *G06F 16/252* (2019.01)

(58) Field of Classification Search
CPC .................................................. G06F 16/278
USPC ........................................................ 707/737
See application file for complete search history.

(56) References Cited

U.S. PATENT DOCUMENTS

| | | | | |
|---|---|---|---|---|
| 5,978,830 | A * | 11/1999 | Nakaya | G06F 9/52 |
| | | | | 718/103 |
| 7,386,391 | B2 * | 6/2008 | Morariu | G06Q 10/047 |
| | | | | 701/19 |
| 8,060,857 | B2 | 11/2011 | Biggerstaff | |
| 8,515,945 | B2 | 8/2013 | Pendap et al. | |
| 8,935,231 | B2 | 1/2015 | Bestgen et al. | |
| 9,959,312 | B2 | 5/2018 | Schneider | |
| 10,089,357 | B2 | 10/2018 | Shivarudraiah et al. | |
| 10,261,950 | B2 | 4/2019 | Lee et al. | |
| 10,496,760 | B2 | 12/2019 | Boehme et al. | |
| 2005/0253949 | A1 * | 11/2005 | Maeda | G09G 5/14 |
| | | | | 348/333.01 |
| 2006/0074544 | A1 * | 4/2006 | Morariu | G06Q 10/047 |
| | | | | 701/19 |
| 2014/0373016 | A1 * | 12/2014 | Ruggiero | G06F 9/46 |
| | | | | 718/101 |

(Continued)

OTHER PUBLICATIONS

Koebler, T., "How to Improve the Initial Load," 9 pages, Sep. 26, 2013.

*Primary Examiner* — Muluemebet Gurmu
(74) *Attorney, Agent, or Firm* — Sterne, Kessler, Goldstein & Fox P.L.L.C.

(57) ABSTRACT

Disclosed herein are system, method, and computer program product embodiments for replicating data from table in a source database to a target database. In some embodiments, data replication includes access plan delimitation and access plan calculation steps and is performed on a table having multiple partitions. A table may be divided into one or more partitions and each partition may be further divided into one or more access plans. Access plan delimitation may involve calculating, in parallel, boundaries of access plans within partitions of the table. Access plan calculation may be initiated on the first partition that has completed the access plan delimitation steps, and may involve transferring data from each delimited partition from the table in the source database to the target database.

18 Claims, 6 Drawing Sheets

(56) References Cited

U.S. PATENT DOCUMENTS

| | | | |
|---|---|---|---|
| 2020/0034365 A1* | 1/2020 | Martin | G06F 16/24554 |
| 2020/0117680 A1* | 4/2020 | Bapat | G06F 16/2358 |
| 2020/0193184 A1* | 6/2020 | Okada | G06V 10/25 |
| 2020/0320095 A1 | 10/2020 | Haase et al. | |
| 2022/0075770 A1* | 3/2022 | Beier | G06F 16/235 |

* cited by examiner

PARALLEL CALCULATION OF ACCESS PLANS DELIMITATION USING TABLE PARTITIONS

BACKGROUND

Databases store a wide variety of data and are continually updated. The size of databases has grown to accommodate ever-growing data collected by users. As these updates are made, mechanisms are typically utilized to capture and provide the updates to subscribers. The increased size of databases leads to issues when attempting to replicate tables in the database. Database replication usually involves a source system initially transferring data from a source table to a target system. This process is called initial load. When a source table is particularly large (i.e., has a large number of rows), making the transfer resilient to failure becomes increasingly important. One approach involves separating the initial load into two steps: dividing the rows in the table into different portions to reduce processing demands during the transfer and then performing the transfer of each portion after the partitioning is complete. However, this approach still leads to extended transfer times because the partitioning is implemented as a single process and the transfer cannot occur until partitioning of the entire table is completed.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for replicating data from a source system to a target system using parallelization.

In an embodiment, a table may divided into one or more partitions and each partition may further be divided into one or more access plans. Each partition represents a subset of table data in the table, such as a certain number of rows within the table, and each access plan represents a subset of table data within its respective partition, such as a certain number of rows within the partition.

Determining boundaries of each access plan within each partition is an important step in detecting access plans within the partition. Determining the boundaries may consist of two steps. First, rows of the partition may be parsed by reading key fields from each row where each Nth row may define boundaries of respective access plans; this step is called access plan delimitation. Variable "N" may be defined by the user or the replication server and may be based on system resources or desired size of the access plans. And second, after all boundaries for access plans are calculated, data from each access plan may be read independently; this step is called access plan calculation.

In an embodiment, access plan delimitation may be further improved via parallel processing of each partition for calculating each access plan's boundaries. That is, instead of being performing the delimitation calculation as a single process where a partitioned table is read in its entirety (i.e., each partition is ignored), the delimitation calculation of each partition may take place via separate processes, such as a background job by a processor. In addition to improving the speed of access plan delimitation, the overall speed of data transfer from the source table may also be increased because access plan calculation may be initiated as soon as delimitation of any partition is completed.

Parallelization of the delimitation process requires novel improvements such as changes to how the partitions of a source table are processed, new database tables for tracking the processing of each partition, and new classes for initiating the delimitation process.

Further detail regarding embodiments for source table replication using parallel processing of table partitions will be discussed below and throughout this disclosure. Various embodiments of these features will now be discussed with respect to the corresponding figures.

Figure 1:
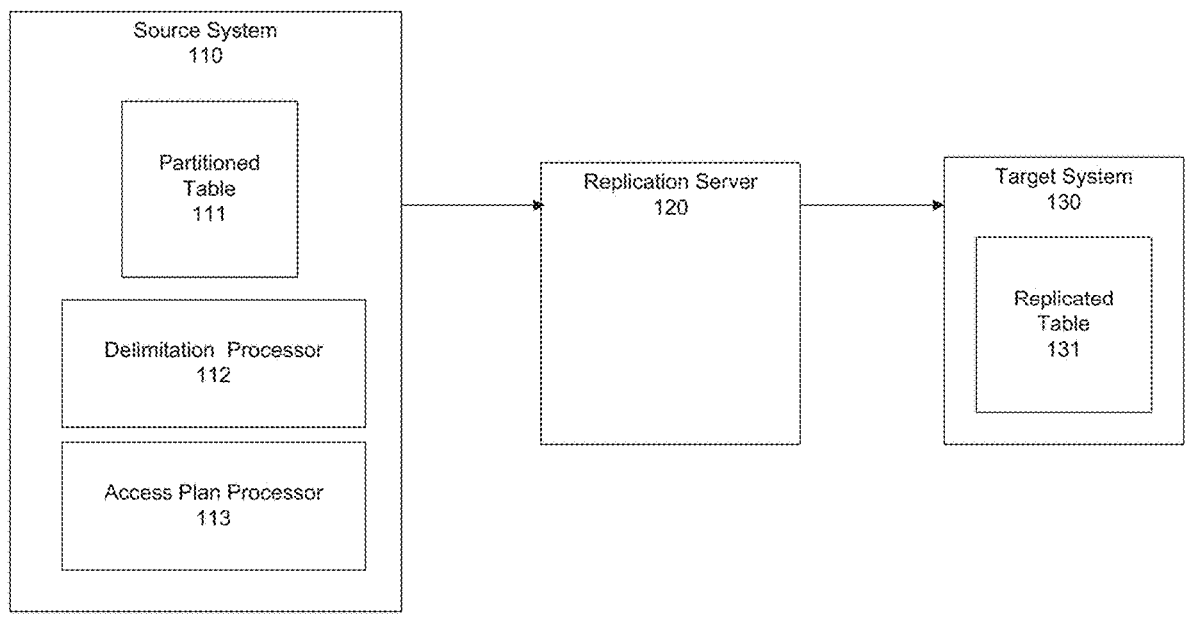
FIG. 1 depicts a block diagram of a system for replicating data from a source system to a target system, according to some embodiments.

FIG. 1 depicts an example database system 100 utilizing a replication server 120 utilizing parallel processing for replicating data from partitioned table 111 of source system 110 to replicated table 131 of target system 130. Database system 100 may include source system 110, target system 130, and replication server 120. In some embodiments, replicated table 131 may be a partitioned table. In some embodiments, target system 130 may define a filter for reducing partitioned table 111 and replicated table 131 is not partitioned based on the filter. Source system 110 and target system 130 may be managed by the same or a different entity that manages replication server 120. For example, in some embodiments, source system 110 and target system 130 may be managed by the same entity, and replication server 120 may be managed by a different entity.

Source system 110 may contain a database storing partitioned table 111. Target system 130 may contain a database that stores replicated table 131 which represents a table that is the result of replicating data from partitioned table 111 using the parallel processing described in this disclosure. That is, after the replication process, replicated table 131 contains the same data from partitioned table 111. In some embodiments, replicated table 131 may also contain transformed data from partitioned table 111; for example, data in replicated table 131 may have additional data fields or removed data fields compared to data in partitioned table 111.

Source system 110 may further include delimitation processor 112 and access plan processor 113. Delimitation processor 112 and access plan processor 113 may communicate with replication server 120 to facilitate replication of data from partitioned table 111 to target system 130. Delimitation processor 112 performs a delimitation calculation of partitioned table 111. The delimitation calculation may involve performing a delimitation calculation on each partition of partitioned table 111. In other words, a delimitation calculation may include a number of delimitation calculations performed separately on each partition so the total number of delimitation calculations performed is based on the total number of partitions in partitioned table 111.

In an embodiment, partitions represent portions of partitioned table 111 and access plans represent portions of respective partitions. The delimitation calculation process may involve first determining the partitions in partitioned table 111 and then identifying boundaries of access plans within each partition. Identifying access plans may include reading key fields of rows in each partition, sorting the key fields, and then determining the boundaries of each access plan within each partition of partitioned table 111. An example of a key field is a row identifier for a particular row in the table. Reading only the key fields of a row (as opposed to all fields in the row) may simplify processing by eliminating the need to read the entire row or even the entire table during delimitation calculation.

In an embodiment, determining the boundaries of access plans for each partition may involve determining a certain interval of rows to be included in each access plan. For example, an interval may be specified as a number "N" which specifies that every Nth row within a partition defines the scope of an access plan of that partition. The boundaries of access plans may be defined by the key field. For example, the boundaries of a first access plan may be "KeyField>1" and "KeyField<100" and the boundaries of a second access plan may be "KeyField>101" and "KeyField<200," or 100 rows of a table in each partition.

As another non-limiting example, partitioned table 111 may include 1,000,000 rows having ten partitions of 100,000 rows each. Number "N" may be defined as 25,000 which would result in four access plans within each partition and each access plan having boundaries defined by the values in an identified key field. For example, a first access plan of the first partition may be defined by boundaries "KeyField>1" and "KeyField<25,000," the second partition defined by "KeyField>25,0001" and "KeyField<50,000," and so on until all rows of each partition in the table have been processed. In this embodiment, processing of the rows for access plan delimitation may involve simply reading the key fields of each row and ignoring the other data in each row. The use of numerical values for the boundary are merely exemplary and could be any value that can be sorted in a particular order.

In an embodiment, the number "N" may be based on a user input, a predefined number provided by replication server 120, or dynamically changed based on other parameters such as the number of rows in partitioned table 111, the processing capability of delimitation processor 112, and the desired size of each access plan. For example, processing capability of delimitation processor 112 may factor into the number of background jobs that can be performed by delimitation processor 112. A delimitation processor that is capable of performing 20 background jobs may allow partitioned table 111 to be partitioned into more partitions (i.e., N can be smaller) which increases the number partitions that undergo the delimitation calculation in parallel. As another example, the number of rows of partitioned table 111 may trigger the parallelization of the delimitation calculations; a number of rows that is above a threshold may have a predefined number for "N" but below the threshold may have a another predefined number for "N." As another example, the number of rows may be adjusted based on the desired size of the plan (e.g., 8 megabytes).

Delimitation processor 112 may perform the delimitation calculation on each partition in partitioned table 111 with each delimitation calculation being performed in parallel with each other. For example, if there are eight partitions in a table, the delimitation calculation for each partition may be performed in parallel. In an embodiment, the number of delimitation calculations being determined may be based on the capability of delimitation processor 112. Performing the delimitation calculation in parallel increases the speed at which access plans within each partition of partitioned table 111 may be identified. Moreover, access plan processor 113 may initiate access plan calculation as soon as the first delimitation calculation for a partition is completed. This allows the access plan calculation to begin transferring data from the completed partition to the target database even if delimitation calculations are still taking place for other partitions.

In an embodiment, partition identifiers may be placed in a queue accessible to access plan processor 113 to identify partitions whose delimitation calculation has completed that are next in line for access plan calculation. The order in which partition identifiers are placed in the queue may indicate the order in which the delimitations calculations for each partition are completed. Access plan processor 113 may then initiate the access plan calculation on each partition based on the order of the partition identifiers in the queue. In an embodiment, the order may be based on the order in which the delimitation calculation of a partition is completed. As noted above, access plan calculation involves transferring the entire content of each partition from partitioned table 111 to replicated table 131. Accordingly, unlike access plan delimitation, access plan calculation requires reading the entire data contents from each row of the table, not just the key field or fields, as part of transferring the data contents to replicated table 131.

In an embodiment, partition identifiers may be utilized to initiate the delimitation calculation and access plan calculation for a respective partition. For example, interfaces that are used for accessing the data in a table may be modified to allow use delimitation processor 112 to access the key fields for rows in the partition associated with a particular partition identifier as part of the access plan delimitation. Similarly, access plan processor 113 may utilize the partition identifier to read data from rows the partition in order to transfer the data from the partition to a target database as part of access plan calculation.

Delimitation processor 112, access plan processor 113, and replication server 120 together coordinate transfer of data from source system 110 to target system 130. Replication server 120 receives data from portions of partitioned table 111 and transfer the data to replicated table 131 in target system 130. In some embodiments, replication server 210 coordinates processes of delimitation processor 112 and access plan processor 113 to perform the data transfer. These processes may include preparing the data for transfer.

Figure 2:
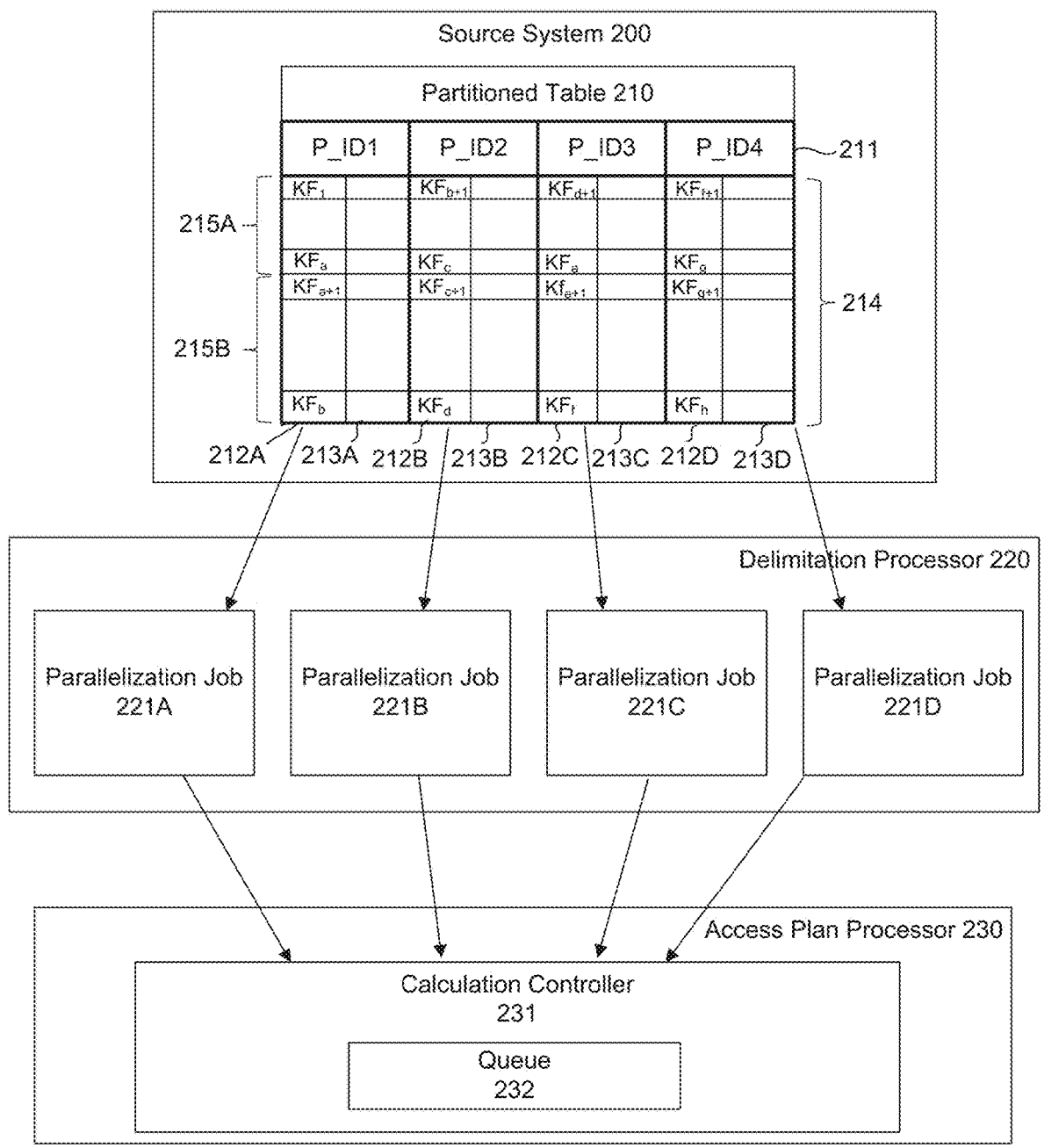
FIG. 2 depicts a block diagram of processing a partitioned table using a delimitation processor and access plan processor of FIG. 1, according to some embodiments.

FIG. 2 depicts a block diagram of processing partitioned table 210 located in source system 200 using a delimitation processor 220 and access plan processor 230. In an embodiment, source system 200, partitioned table 210, delimitation processor 220, and access plan processor 230 may correspond to source system 110, partitioned table 111, delimitation processor 112 and access plan processor 113, respectively, of FIG. 1, according to some embodiments.

As a non-limiting example, partitioned table 210 may include four separate partitions with each partition identified using a partition identifier 211 such as "P_ID1," "P_ID2," "P_ID3," and "P_ID4." Each partition may have rows 214 and each row includes key fields 212A-212D which may be used to identify boundaries of respective access plans 215A-215B within each partition. The number of partitions, rows, and access plans are merely exemplary and simplified solely for discussion. Partitioned table 210 may include any number of partitions, rows, and access plans.

In an embodiment, values in the key field, when ordered in sequential order, may be used to define the starting and end rows of access plans 215A-215B in each partition. For example, $KF_1$ and $KF_a$ may define the starting and end rows for access plan 215A (for partition P_ID1) and $KF_{a+1}$ and $KF_b$ may define the starting and end rows for access plan 215B (for partition P_ID1). Similarly, $KF_{b+1}$ and $KF_c$ may define the starting and end rows for access plan 215A (for partition P_ID2) and $KF_{c+1}$ and $KF_d$ may define the starting and end rows for access plan 215B (for partition P_ID2); and so on, for each of the partitions associated with partition identifiers 211, P_ID3 and P_ID4. In an embodiment, the number of rows in each partition are the same and each access plan are the same (e.g., every Nth row of partitioned table 210); in another embodiment, the number of rows are divided as equally as possible between each of the partitions with a remainder of the rows being included the last partition. For example, a table with one hundred and seven rows may be partitioned into five partitions with twenty-five rows in four partitions and seven rows in the fifth partition. In another example, the number of rows in each partition and each access plan may vary depending on user preference or system capabilities. Rows 214 in each access plan may include other data beyond key fields 212A-212D. For example, partition P_ID1 may include data 213A, partition P_ID2 may include data 213B, partition P_ID3 may include data 213C, and partition P_ID4 may include data 213D.

Each partition of partitioned table 210 may be provided to delimitation processor 220 for implementing the delimitation calculation of each partition in parallel. In an embodiment, the delimitation calculations of the partitions may utilize parallel processing capability of delimitation processor 220 and with the delimitation calculation being implemented as parallelization jobs 221A-221D. Parallelization jobs 221A-221D may be implemented as background jobs of delimitation processor 220 and each delimitation calculation may correspond to a parallelization job. Each parallelization job is intended to determine the boundaries of each partition may include the steps of reading a key field (or fields) of each row, sorting the rows based on the key field, and defining each access plan based on the sorted rows and interval defining the number of rows in each access plan.

In an embodiment, the number of parallelization jobs corresponds to the number of partitions. In another embodiment, the number of parallelization jobs is defined by other parameters such as the parallel processing capability of delimitation processor 220 or a user provided input. If the number of parallelization jobs is smaller than the number of partitions to perform the delimitation calculation, then the parallel delimitation calculations may be separated into batches. The number of batches may be determined based on the number of parallelization jobs and the number of partitions. As a non-limiting example, when the number of partitions is twelve and the number of parallelization jobs is four, the parallel delimitation calculations may be separated into three batches with the delimitation calculations of the first four partitions corresponding to the first batch, the second four partitions corresponding to the second batch, and the remaining four partitions corresponding to the third batch.

In an embodiment, delimitation processor 220 may start the delimitation calculation of a partition in a subsequent batch as soon as a parallelization job becomes available and while the delimitation calculations of other partitions are still taking place. Continuing the example above, when the first delimitation calculation for a partition is completed in the first batch, a parallelization job (e.g., parallelization job 221A) may become available. Other parallelization jobs (e.g., parallelization jobs 221B-221D) may still be executing delimitation calculations on their associated partitions as part of the first batch. Delimitation processor 220 may start processing a partition from the second batch using the available parallelization job (e.g., parallelization job 221A). In this manner, delimitation processor 220 does not have to wait to complete the first batch of delimitation calculations before starting the delimitation calculation of a partition in the next batch.

The result of the delimitation calculation of each access plan is the boundaries for each access plan. For example, the delimitation calculation of access plans in partition P_ID1 results in identifying $KF_1$ and $KF_a$ as boundaries for a first access plan and $KF_{a+1}$ and $KF_b$ for a second access plan. Delimitation processor 220 may store determined boundaries for each access plan for later access.

As parallelization jobs 221A-221D are completed by delimitation processor 220, partition identifiers 211 for completed partitions as well as the boundaries for each access plan may be provided to access plan processor 230 which, in some embodiments, includes calculation controller 231 and queue 232. In an embodiment, partition identifiers 211 for completed partitions may be placed in queue 232 in the order that they are provided by delimitation processor 220 (i.e., as delimitation calculations for a partition are completed). Calculation controller 231 may be responsible for initiating access plan calculation for replicating data in partitioned table 210 by reading data from each row of an access plan, as defined by the boundaries, and transferring the data from source system 200 to a target system. Replicated data may be stored in the target system as part of table.

Figure 3A:
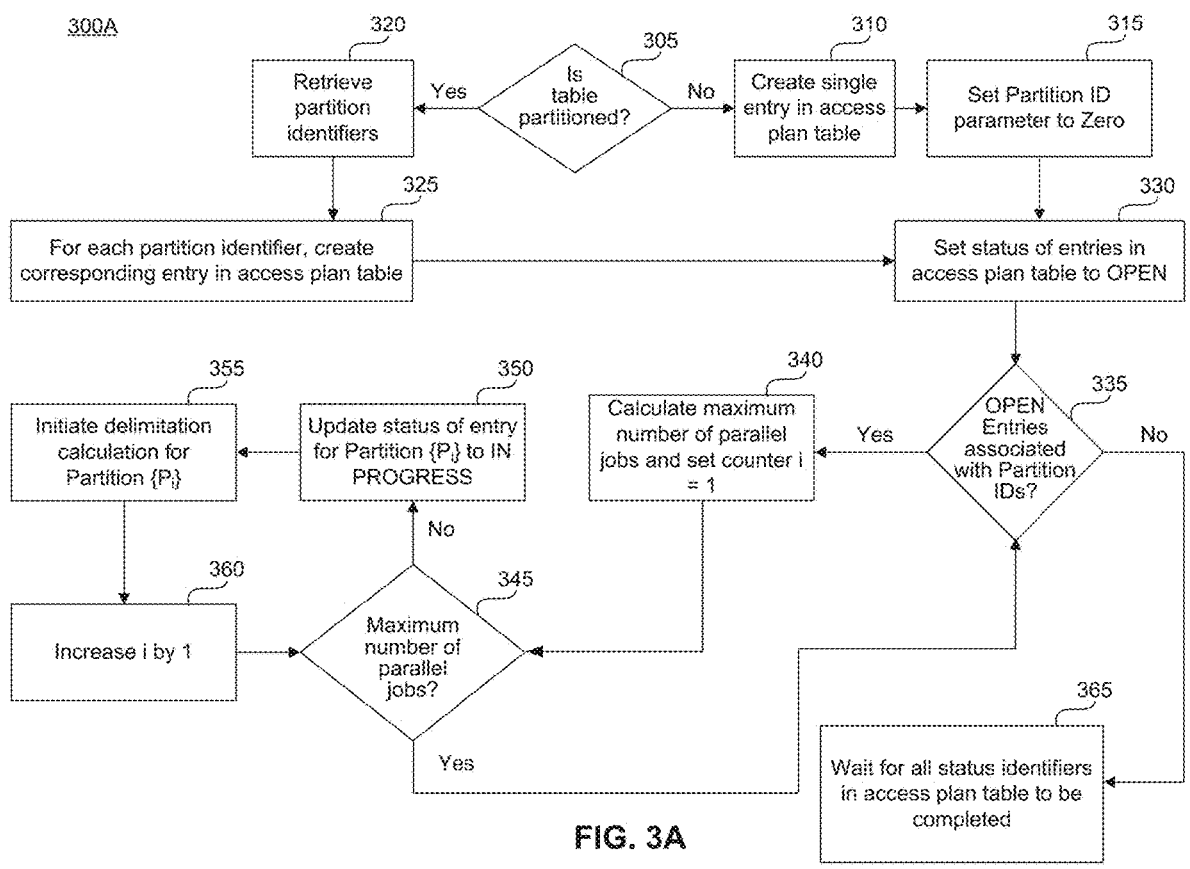
FIG. 3A. depicts a flowchart illustrating a method for parallel processing of table partitions in a table, according to some embodiments.

FIG. 3A depicts a flowchart illustrating a method for parallel processing of table partitions in a table, according to some embodiments. As a non-limiting example with regards to FIGS. 1 and 2, one or more processes described with respect to FIGS. 3A and 3B may be performed by a delimitation processor and access plan processor (e.g., delimitation processor 220 and access plan processor 230 of FIG. 2) for determining, in parallel, boundaries of access plans within partitions of a table in a source database (e.g., source system 110) and transferring data from the access plans based on the boundaries to a target database (e.g., target system 130) via a replication server (e.g., replication server 120). In such an embodiment, delimitation processor 220 and access plan processor 230 may execute code in memory to perform certain steps of method 300A of FIG. 3A and method 300B of FIG. 3B. While method 300A of FIG. 3A and method 300B of FIG. 3B will be discussed below as being performed by delimitation processor 220 and access plan processor 230, other devices including may store the code and therefore may execute method 300A or method 300B by directly executing the code. Accordingly, the following discussion of method 300A or method 300B will refer to devices of FIGS. 1 and 2 as an exemplary non-limiting embodiment of method 300A or method 300B. For example, method 300A or method 300B may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof. Moreover, it is to be appreciated that not all steps may be needed to perform the disclosure provided herein. Further, some of the steps may be performed simultaneously or in a different order than shown in FIGS. 3A and 3B, as will be understood by a person of ordinary skill in the art.

At 305, delimitation processor 220 and/or access plan processor 230 may determine whether a table to be transferred from source system 110 to target system 130 is partitioned. Source system 110 may include more than one table that includes partitioned table 111. One or more of these tables may or may not be partitioned. This determination may be performed by delimitation processor 220. If there are no partitions in the table, then access plan delimitation proceeds without any parallel processing of partitions. If there are partitions in the table, such as with partitioned table 111, then the parallel processing may take place.

At 310, a data structure is generated to indicate that the table does not include any partitions. For example, the data structure may be styled as an access plan table. In this step, the data structure includes a single entry to represent that table and no other identifiers corresponding to any partitions.

At 315, the entry in the access plan table may be updated to further indicate that there are no partition identifiers corresponding to any partitions in the table. In an embodiment, the partition identifier may be set to a zero value to indicate the lack of partitions in the table.

At 320, upon determining that the table is partitioned, such as partitioned table 220, delimitation processor 220 may retrieve the partition identifiers associated with each partition in partitioned table 220. For example, with partitioned table 220, delimitation processor 220 may retrieve partition identifiers 211, P_ID1, P_ID2, P_ID3, and P_ID4.

Figure 4:
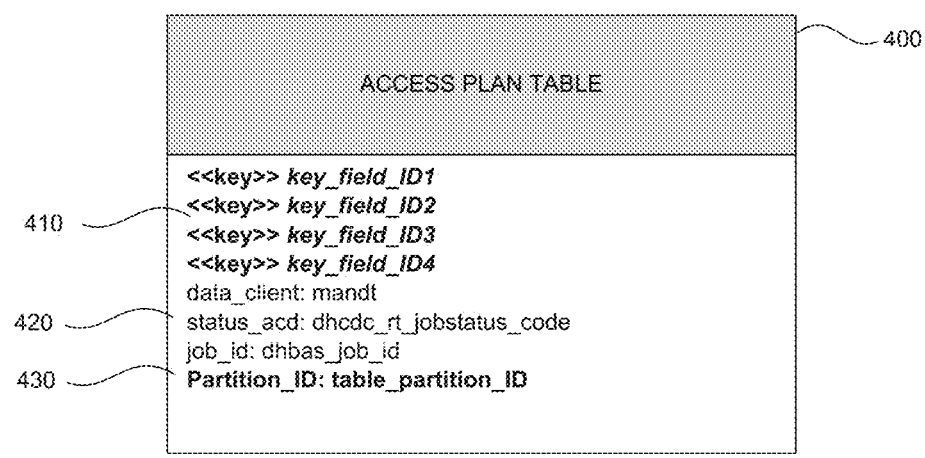
FIG. 4 depicts a block diagram of an access plan table, according to some embodiments.

At 325, for each retrieved partition identifier, delimitation processor 220 and/or access plan processor 230 may create a corresponding entry in a data structure, which in some embodiments, may be generated as an access plan table. The data structure indicates the number of partitions in partitioned table 220 and may be used to track the status of the delimitation calculation for each partition. Reference is made to FIG. 4 which depicts a block diagram of access plan table 400, according to some embodiments. Access plan table 400 includes key field identifiers 410 to indicate the respective partitions in partitioned table 220. In an embodiment, key field identifiers 410 may be implemented as key fields. Four key fields are depicted in FIG. 4 but any number of key fields may be implemented as part of access plan table 400. Key field identifiers 410 may refer to any number of identifiers implemented in access plan table 400. An example of a key field identifier is an identifier that distinguishes between different delimitations between different tables (e.g., "acd_id"). Partition key field 430 represents an identifier for the partition (e.g., "table_partition_ID") and may be used to refer to the specific partition. Each partition in the table may be assigned a unique partition identifier.

Returning to FIG. 3A, at 330, the status of any entries in the access plan table resulting from 315 and 325 are updated to indicate they are open and pending processing via a delimitation calculation. For example, the status identifier "OPEN" may be used to indicate that delimitation calculations have not yet started or completed for any partitions identifier in the access plan table.

At 335, delimitation processor 220 and/or access plan processor 230 may examine access plan table 400 to determine whether a delimitation calculation needs to be performed on any partitions. This determination may be based on determining whether there are any entries in access plan table 400 are associated with a partition identifier and whether there are any entries whose status indicates that they are open. For example, delimitation processor 220 and/or access plan processor 230 may check a status identifier associated with a partition in access plan table to see if there are any open entries associated with partition identifiers who have non-zero values. In a table where there are no partitions, the access plan table would have a partition identifier with a zero value but with a single open entry representing the entire table. Accordingly, processing of such a table would move to 340 to address the open entry.

At 340, delimitation processor 220 begins the delimitation calculation on a batch of partitions by first determining the maximum number of parallel jobs that may be performed by delimitation processor 220. Delimitation processor 220 also determines the number of partitions on which to perform the delimitation calculation. This determination may be based on the number of partition identifiers located in access plan table 400. For example, four partition identifiers in access plan table 400 indicates four partitions. Delimitation processor 220 may also track the current partition by updating a tracking counter, e.g., "i". For example, when parallel delimitation calculation begins, the tracking counter is set to 1 to indicate the delimitation calculation for the first partition is being initiated. This tracking counter may be used to keep track of the current partition that is being processed by delimitation processor 220. The tracking counter may also be used to determine whether the maximum number of parallel jobs is currently being executed by delimitation processor 220. In some embodiments, replication server 120 also determines the number of parallel jobs are already running.

At 345, based on the maximum number of parallel jobs, the number of parallel jobs already running, delimitation processor 220 may determine whether it can handle any additional parallel jobs. In other words, delimitation processor 220 may determine whether it is already executing the maximum number of delimitation calculations on partitions.

Consider the following non-limiting example where the maximum number of parallel jobs for delimitation processor 220 may be four. When there are zero parallel jobs running (i.e., the delimitation calculations for any partitions have not yet begun) or if the number of parallel jobs already running is less than four (e.g., two or three), delimitation processor 220 at 345 determines that the maximum number of parallel jobs has not yet been met. Accordingly, delimitation processor 220 moves to 350. However, if there are already four parallel jobs being executed by delimitation processor 220, then the maximum number of parallel jobs is already met and delimitation processor 220 returns to 335.

At 350, when the number of maximum number of parallel jobs has not been met, then delimitation processor 220 may continue delimitation calculation for the next available partition. Delimitation processor 220 may update the status identifier of the entry in the access plan table to indicate that the delimitation calculation for the next available partition (as indicated by the tracking counter). For example, delimitation processor 220 may update the status identifier to "IN PROGRESS" to indicate that the delimitation calculation is in progress for that partition.

Figure 3B:
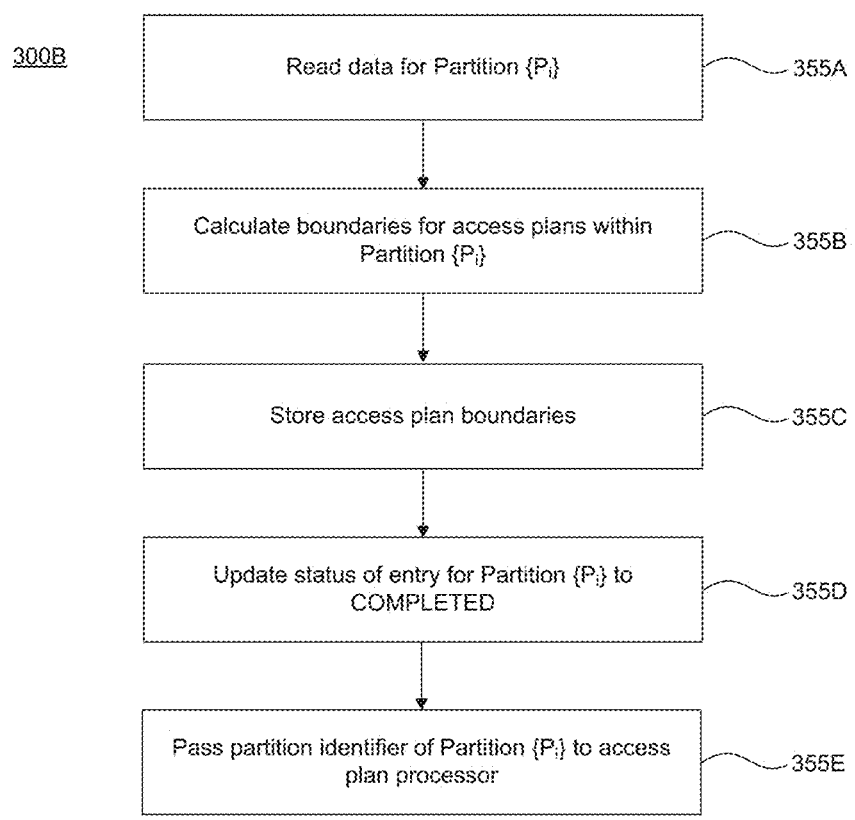
FIG. 3B depicts a flowchart illustrating a method for delimitation calculation for a partition, according to some embodiments.

At 355, delimitation processor 220 may start the delimitation calculation for the current partition as indicated by the tracking counter. FIG. 3B depicts a flowchart illustrating a method 300B for the delimitation calculation, according to some embodiments. In 355A, delimitation processor 220 reads data from the current partition. In an embodiment, delimitation processor 220 reads only the key field or fields of each row of the partition. Rows in the partition may be sorted based on one or more key fields prior to determining boundaries of the access plan. In an embodiment, boundaries are determined based on an interval, or the number of rows in each access plan, so ordering the rows based on key field. In 355B, delimitation processor 220 calculates boundaries for each access plan in the current partition based on the key field in 355B. For example, if value of the key fields are numerical (e.g., "1" to "100"), rows in the partition may be sorted in numerical order. Calculating boundaries for access plans in the current partition may then involve dividing the rows in the current partition based on the interval value. For example, an interval of ten would place ten rows into each access plan of the current partition. Delimitation processor 220 may retrieve the interval value from memory of the replication server or any other source. As previously described, the interval value may be provided via user input, be a default value, or calculated dynamically based on other parameters such as desired memory size for each access plan. Delimitation processor 220 may notify access plan processor 230 that delimitation is completed and then may move to the next partition. Access plan processor 230 may then initiate access plan calculation based on the notification from delimitation processor 220. In this manner, delimitation processor 220 and access plan processor 230 may perform their respective functions in parallel.

In 355C, delimitation processor 220 stores the calculated boundaries for each access plan in the current partition in a memory of the replication server or other memory accessible to delimitation processor 220 and access plan processor 230. In 355D, delimitation processor 220 updates the status identifier for the current partition to indicate that delimitation calculation for the current partition has completed. For example, delimitation processor 220 may update the status identifier to "completed" or some other value other than "open."

In 355E, delimitation processor 220 may provide the partition identifier of the current partition to access plan processor 230 as an indication that the delimitation calculation for the current partition has been completed. In some embodiments, access plan processor 230 may then initiate the access plan calculation for the current partition upon receiving the partition identifier and if access plan processor 230 is not currently performing access plan calculation on another partition. As previously described, performing access plan calculation on a partition involves replicating data in all access plans of the partition to a target database by reading through all data each row of an access plan and transferring the data to a corresponding table in the target database. Access plan calculation utilizes the boundaries of each access plan to define the scope of the data to be transferred. Utilizing boundaries for access plan calculation improves the resiliency of the data transfer by limiting the amount of data to be transferred in one job. That is, if a transfer job fails, then access plan processor 230 only needs to restart data transfer for a subset of the rows of the table (as defined by the access plan) rather than for the entire table (if the table were not divided into partitions) or partition (if the partition were not divided into access plans).

In an embodiment, access plan processor 230 may initiate one access plan calculation on a partition at a time. Accordingly, access plan processor 230 may place the partition identifier into queue 232 if it has already initiated access plan calculation on another partition. Access plan calculation may occur in parallel with data transfer; that is, when access plan calculation for a partition is completed (while other partitions are still being calculated), data transfer for the completed partition may be initiated while access plan calculation for the other partitions is still taking place.

In some embodiments, access plan processor 230 may transfer data to replication server 120 from all access plans within a partition as identified by the stored boundaries before moving on to the next partition. In some embodiments, access plan processor 230 may switch between different partitions or different access plans and does not need to process a partition in its entirety before processing other partitions. When the access plan calculation for a partition is completed, then access plan processor 230 may initiate the access plan calculation on the next partition identified by the partition identifier in queue 232.

Returning to FIG. 3A, at 360, delimitation processor 220 may then update the tracking counter to indicate the next partition to be processed (i.e., the delimitation calculation for the current partition has been initiated). For example, the tracking counter may be incremented by one.

Method 300A then returns to 345 to determine whether delimitation processor 220 is processing the maximum number of parallel jobs. In an embodiment, delimitation processor 220 compares the tracking counter to the number of parallel jobs available to delimitation processor 220. If the tracking counter indicates that more parallel jobs can be performed (i.e., delimitation processor 220 is not executing the maximum number of parallel jobs), then method 300A returns to 350 to process the next partition indicated by the counter. If the tracking counter indicates that delimitation processor is already processing the maximum number of parallel jobs, then method 300A returns to 335 to determine whether there are any remaining open entries (i.e., any entries that are not marked as being in progress or completed) in access plan table. If there are remaining open entries, that indicates that there are additional partitions to perform the delimitation calculation.

If there are no remaining open entries, then method 300A proceeds to 365 and waits for in progress delimitation calculations for any partitions to be completed. For example, delimitation processor 220 may monitor the status identifiers in the access plan table to determine when all status identifiers have been updated to indicate completed delimitation calculations (e.g., "Completed"). When all status identifiers have been updated in this manner, then access plan delimitation for the partitions is finished.

As noted above, FIG. 4 depicts a block diagram of access plan table 400, according to some embodiments. Other configurations of access plan table 400 are possible without departing from the scope of the invention. For example, access plan table 400 may be implemented as two separate tables to be used during the two steps of the data transfer, a first table that tracks the status of the delimitation calculation during access plan delimitation and a second table that represents the completed delimitation calculation and is used during access plan calculation. Access plan table may also include additional identifiers 420 for indicating the status of the job and a job identifier for the delimitation calculation associated with that partition.

Figure 5:
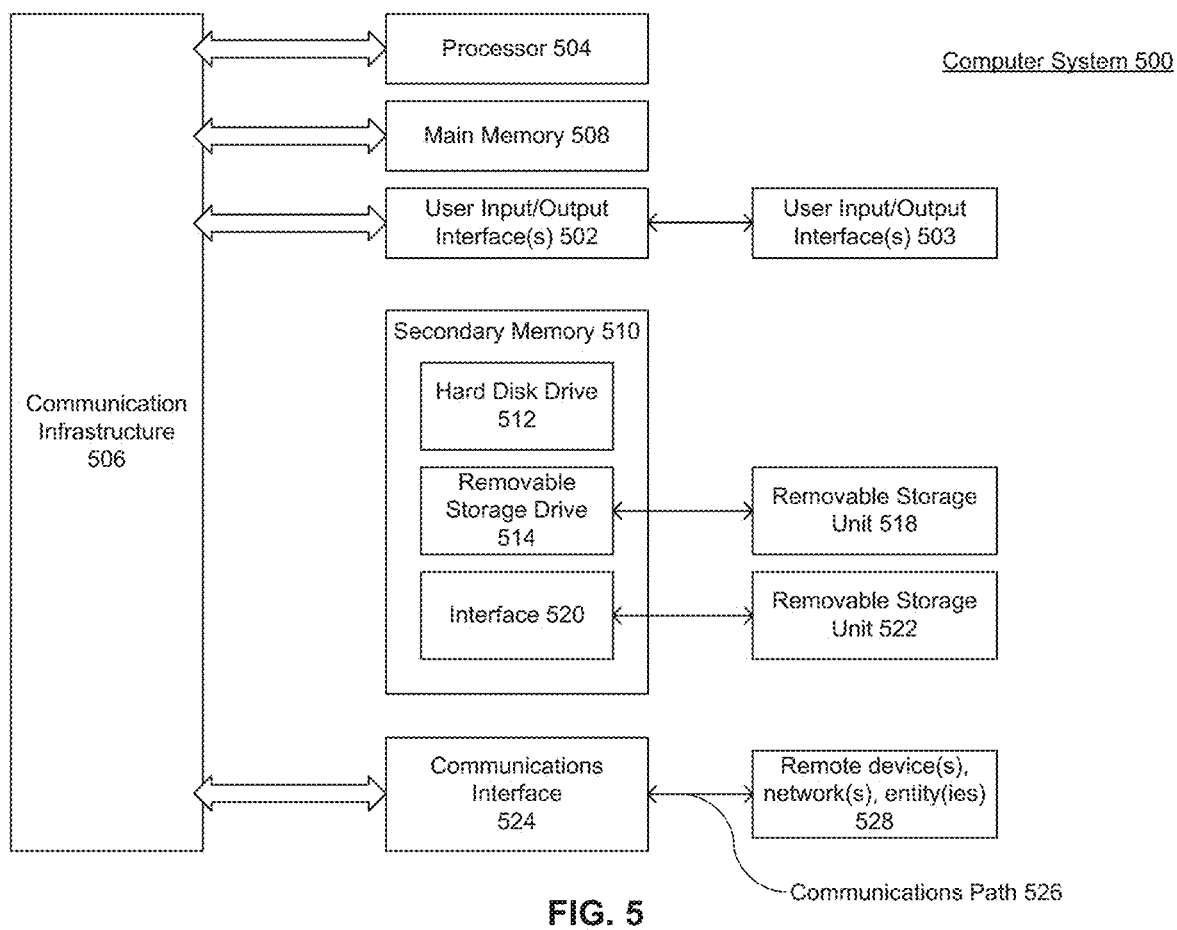
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to a removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for replicating data from a table in a source database to a target database, the method comprising:
   determining, by at least one processor, whether the table includes a plurality of partitions, wherein the plurality of partitions comprises at least a first partition and a second partition;
   initiating, by the at least one processor, a delimitation calculation of the plurality of partitions, wherein the delimitation calculation results in forming a first plurality of access plans in the first partition and a second plurality of access plans in the second partition, wherein the delimitation calculation comprises a first delimitation calculation and a second delimitation calculation, wherein the first delimitation calculation and the second delimitation calculation are initiated in parallel and wherein the first delimitation calculation comprises calculating first boundaries for the first plurality of access plans and wherein the second delimitation calculation comprises calculating second boundaries for the second plurality of access plans, wherein the first boundaries comprise a starting boundary and an end boundary for a first access plan in the first plurality of access plans and wherein the starting boundary is a first key field in the table and the end boundary is a second key field in the table;
   determining, by the at least one processor, a completion of one of the first delimitation calculation or the second delimitation calculation is completed;
   initiating, by the at least one processor, an access plan calculation of the table responsive to determining the completion.

2. The computer-implemented method of claim 1, wherein the access plan calculation comprises:
   responsive to calculating the first boundaries for the first plurality of access plans, transferring, by the at least one processor, data in the first plurality of access plans from the table in the source database to the target database; and
   responsive to calculating the second boundaries for the second plurality of access plans, transferring, by the at least one processor, data in the first plurality of access plans from the table in the source database to the target database.

3. The computer-implemented method of claim 1, wherein the first partition comprises a plurality of key fields including the first key field and the second key field, and wherein calculating the first boundaries comprises:
   reading, by the at least one processor, the plurality of key fields in the first partition, wherein each key field in the plurality of key fields identifies a respective table row in the first partition; and
   determining, by the at least one processor, the second key field based on a defined interval from the first key field.

4. The computer-implemented method of claim 1, the method further comprising:
   responsive to the determining, generating, by the at least one processor, an access plan table for tracking a status of the delimitation calculation of the plurality of partitions, wherein the access plan table includes a plurality of entries wherein the plurality of entries comprises a first entry associated with the first partition and a second entry associated with the second partition,
   wherein the first delimitation calculation further comprises updating, responsive to calculating the first boundaries, a first status of the first entry to indicate completion of the calculating of the first boundaries,
   wherein the second delimitation calculation further comprises updating, responsive to calculating the second boundaries, a second status of the second entry to indicate completion of the calculating of the second boundaries.

5. The computer-implemented method of claim 1, wherein the first delimitation calculation and the second delimitation calculation are initiated in parallel as background jobs executed by the at least one processor.

6. The computer-implemented method of claim 1, further comprising:
   determining, by the at least one processor, a maximum number of parallel jobs to be initiated by the at least one processor for the delimitation calculation of the plurality of partitions;
   determining, by the at least one processor, a number of jobs currently being executed by the at least one processor; and
   determining, by the at least one processor, a total number of partitions in the plurality of partitions.

7. The computer-implemented method of claim 1, wherein determining the completion of one of the first delimitation calculation or the second delimitation calculation is completed comprises:
   determining, by the at least one processor, the completion of the first delimitation calculation;

storing, by the at least one processor, a partition identifier associated with the first partition; and detecting, by the at least one processor, the partition identifier in a queue associated with the access plan processor.

8. The computer-implemented method of claim 1, wherein the delimitation calculation further comprises a third delimitation calculation and a fourth delimitation calculation, wherein the first delimitation calculation, the second delimitation calculation, the third delimitation calculation, and the fourth delimitation calculation are initiated in parallel.

9. A system for replicating a table from a source database to a target database, the system comprising:

a memory; and at least one processor coupled to the memory and configured to:

determine whether the table includes a plurality of partitions, wherein the plurality of partitions comprises at least a first partition and a second partition;

initiate a delimitation calculation of the plurality of partitions, wherein the delimitation calculation comprises a first delimitation calculation and a second delimitation calculation, wherein the delimitation calculation results in forming a first plurality of access plans in the first partition and a second plurality of access plans in the second partition, wherein the first delimitation calculation and the second delimitation calculation are initiated in parallel and wherein the first delimitation calculation comprises calculating first boundaries for the first plurality of access plans and wherein the second delimitation calculation comprises calculating second boundaries for the second plurality of access plans, wherein the first boundaries comprise a starting boundary and an end boundary for the first partition and wherein the starting boundary is a first key field of the first partition and the end boundary is a second key field of the first partition;

determine completion of one of the first delimitation calculation or the second delimitation calculation; and initiate, responsive to determining the completion, an access plan calculation of the table.

10. The system of claim 9, wherein to initiate the access plan calculation, the at least one processor is further configured to:

transfer data in the first plurality of access plans from the table in the source database to the target database responsive to calculating the first boundary for the first partition; and transfer data in the first plurality of access plans from the table in the source database to the target database responsive to calculating the second boundary for the second partition.

11. The system of claim 9, wherein the first partition comprises a plurality of key fields including the first key field and the second key field and wherein, in calculating the first boundary, the at least one processor is further configured to:

read the plurality of key fields in the first partition, wherein each key field in the key fields identifies a respective table row in the first partition; and determine the second key field based on a defined interval from the first key field.

12. The system of claim 9, the at least one processor further configured to:

generate, responsive to the determining, an access plan table for tracking a status of the delimitation calculation, wherein the access plan table includes a plurality of entries wherein the plurality of entries comprises a first entry associated with the first partition and a second entry associated with the second partition, wherein to initiate the first delimitation calculation, the at least one processor is further configured to:

update, responsive to calculating the first boundary, a first status of the first entry to indicate completion of the calculating of the first boundary, and update, responsive to calculating the second boundary, a second status of the second entry to indicate completion of the calculating of the second boundary.

13. The system of claim 9, wherein the first delimitation calculation and the second delimitation calculation are initiated in parallel as background jobs executed by the at least one processor.

14. The system of claim 9, the at least one processor further configured to:

determine a maximum number of parallel jobs to be initiated by the at least one processor for the delimitation calculation of the plurality of partitions;

determine a number of jobs currently being executed by the at least one processor; and determine a total number of partitions in the plurality of partitions.

15. The system of claim 14, wherein to determine the completion of one of the first delimitation calculation or the second delimitation calculation is completed, the at least one processor is further configured to:

determine the completion of the first delimitation calculation;

store a partition identifier associated with the first partition; and detect the partition identifier in a queue associated with the access plan processor.

16. The system of claim 9, wherein the delimitation calculation further comprises a third delimitation calculation and a fourth delimitation calculation, wherein the first delimitation calculation, the second delimitation calculation, the third delimitation calculation, and the fourth delimitation calculation are initiated in parallel.

17. A non-transitory computer-readable device having instructions stored thereon that, when executed by at least one computing device, cause the at least one computing device to perform operations comprising:

retrieving a table to be transferred from a source database to a target database;

determining whether the table includes a plurality of partitions, wherein the plurality of partitions comprises at least a first partition and a second partition;

initiating a delimitation calculation of the plurality of partitions, wherein the delimitation calculation results in forming a first plurality of access plans in the first partition and a second plurality of access plans in the second partition, wherein the delimitation calculation comprises a first delimitation calculation and a second delimitation calculation, wherein the first delimitation calculation and the second delimitation calculation are initiated in parallel and wherein the first delimitation calculation comprises calculating first boundaries for the first plurality of access plans and wherein the second delimitation calculation comprises calculating second boundaries for the second plurality of access plans, wherein the first boundaries comprise a starting boundary and an end boundary for the first partition and wherein the starting boundary is a first key field of the first partition and the end boundary is a second key field of the first partition;

determining completion of the first delimitation calculation or the second delimitation calculation;

initiating, responsive to determining the completion, an access plan calculation of the table.

18. The non-transitory computer-readable device of claim 17, wherein the access plan calculation comprises:

transferring data in the first plurality of access plans from the table in the source database to the target database responsive to calculating the first boundaries for the first partition; and transferring data in the second plurality of access plans from the table in the source database to the target database responsive to calculating the second boundaries for the second partition.

* * * * *